United States Patent Office 3,809,733
Patented May 7, 1974

---

3,809,733
PRODUCTION OF DOUBLE LAYER LAMINATES
Denis James Henry Sandiford, Welwyn, and Alan George Smith, Harrow, England, assignors to Imperial Chemical Industries Limited, London, England
Continuation-in-part of abandoned application Ser. No. 869,859, Oct. 27, 1969. This application Apr. 24, 1972, Ser. No. 246,862
Claims priority, application Great Britain, Nov. 6, 1968, 52,658/68
Int. Cl. B29d 27/00; B29f 1/06
U.S. Cl. 264—45
14 Claims

ABSTRACT OF THE DISCLOSURE

A laminate of synthetic polymeric materials is produced by an injection moulding process in which the first layer of the laminate is injected through a first sprue to fill the mould cavity which is then enlarged and a second amount of material is injected into the mould through a second sprue which extends through the first layer. One of the charges, preferably the second, may conveniently be of foamable material.

---

Figure 1:
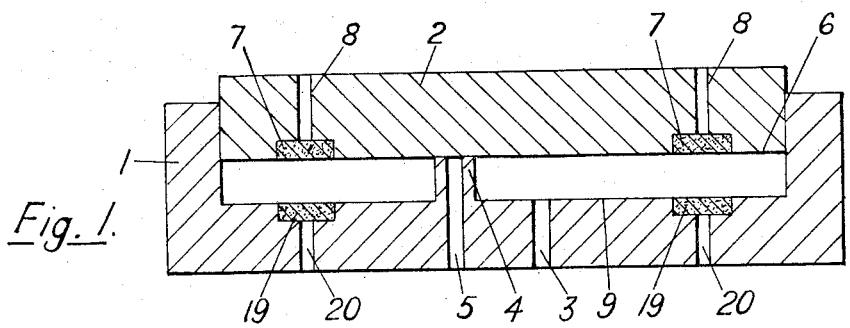

This application is a continuation-in-part of our application Ser. No. 869,859 filed Oct. 27, 1969, now abandoned.

The present invention relates to the production of laminar articles by injection molding.

According to the present invention we provide a process for the production of laminar articles from synthetic polymeric materils in which a first charge of polymeric material is injected into a mold cavity through a first injection orifice and, when said first charge has consolidated, the mold cavity is enlarged and a second charge of polymeric material is injected into the mold cavity through a second injecting orifice at the end of a probe which extends through the layer formed by the injection of said first charge.

It is important that the first charge of polymeric material should have consolidated before the mold cavity is enlarged to allow the second charge to be injected. By consolidated we understand that the first charge of polymeric material has cooled to be sufficiently self-supporting to prevent the material of the first charge from blocking the second injection orifice when the mold cavity is enlarged.

The second charge of material is injected into the mold cavity through an already formed layer of material and thus the mold cavity must contain a second injection orifice for the injection of the second charge of material and this orifice must be shielded during the injection of the first charge so that it does not become blocked during the injection of the first charge. Conveniently the probe projects across the complete thickness of the mold cavity so that, when the mold cavity is at its smallest volume, the orifice at the end of the proble engages with one of the faces of the mold cavity so that it is not in communication with the mold cavity. Enlargement of the cavity, after the first charge has consolidated, is brought about by causing relative movement to take place between that face and an opposed face of the mold cavity so that the orifice at the end of the probe is opened into communication with the mold cavity to allow the second charge of material to be injected into the enlarged cavity through the orifice at the end of the probe.

The present invention also provides a mold suitable for carrying out the process described above which comprises relatively movable mold members defining a mold cavity that is enlargeable by movement of a face of one mold member relative to the opposed face of another mold member, and two injection orifices for the injection of synthetic polymeric material into the mold cavity, one of said orifices being situated at the end of a proble extending across the thickness of the mold cavity from one of said opposed faces to engage with the other of said opposed faces, so that the orifice is not in communication with the mold cavity when the volume of the mold is its smallest, whereas the end of the other orifice is exposed for the introduction of material into the mold cavity, said orifice at the end of the probe being opened into communication with the mold cavity when the mold cavity is enlarged.

In one embodiment of the present invention at least part of one of the charges, preferably the second charge of material, is conveniently of a foamable material; alternatively both charges may be foamable. In this embodiment the charge of foamable material may be the size that will fill the mold cavity when the required amount of foaming has taken place or the mold cavity may be further enlarged when the foamable charge has been injected to allow the charge to foam.

Thus either all of one or both of the charges is of foamable material or else part of one or both of the charges is of foamable material and part of unfoamable material. Thus one or both charges may consist of two charges: a charge of unfoamable material and a charge of foamable material, which are injected through the same injection orifice. In this way the foamable material is introduced to within the unfoamable material. Here again the amount of the two-component charge may be sufficient to fill the mold cavity when foaming has completed or the mold cavity may be enlarged after injection to allow the foamable material to foam. The enlargement of the mold cavity may be instantaneous by relieving the pressure on the mold cavity which will be enlarged by the foaming pressure, or it may be gradual.

If the first charge is of foamable material and the mold cavity is enlarged to allow foaming to take place, care must be taken to ensure that the second injection orifice does not become blocked when the mold cavity is enlarged to allow foaming. This may be achieved by using a telescopic probe which is biased, e.g. by springs, to bear against the opposite face of the mold cavity while it is enlarging to allow the first charge to foam. The biasing mechanism should be such that the orifice at the end of the probe is opened into communication with the mold cavity when the mold cavity is enlarged for the second time to allow the second charge of material to be introduced. A second method is to construct the probe so that it passes through the mold cavity when it is at its minimum volume to slidably engage with a recess formed in the opposite face of the mold cavity in such a way that the orifice is maintained not in communication with the mold cavity when the mold cavity is enlarged to allow the first charge to foam but is opened into communication with the mold cavity when the mold cavity is further enlarged after the first charge has consolidated. This technique of engaging the proble in a recess can only be used when it is acceptable to have surface imperfections in the molding corresponding to the position where the recess is formed.

Where this technique is used, the recess can be formed by a component slidably mounted in the mold member and retracting said component to provide the recess. When the mold is enlarged to permit injection of material through the probe, said component can be arranged to be biased to close said recess so that the end of the component is flush with the rest of the mould surface.

The two injection orifices are connected to sources of synthetic polymeric material which are generally injection molding machines of the reciprocating screw or plunger type. The operation of the machine is generally so synchronised that the mold cavity starts with its volume at its minimum value; the first charge is injected into the mold cavity from one of the machines; the volume of the mold cavity is held at its minimum until the first charge has consolidated; the mold cavity is then enlarged and the second charge injected; and finally, after the materials in the mold cavity have cooled, the mold cavity is opened and the molded article ejected therefrom. If either or both charges are of foamable material and the mold cavity is enlarged to allow foaming, this enlargement must be allowed for in the timing of the operation of the machine. Furthermore, in some molding cycles, the volume of the mold cavity is decreased after a charge has been injected therein to improve the distribution of the polymer within the cavity. If this technique is used after the first charge has been injected it is again necessary to provide means whereby the orifice at the end of the probe is kept in engagement with the opposed face of the mold cavity as compression is effected. Conveniently this may be achieved by using a telescopic probe which is biased against the opposite face of the mold cavity. If this compression technique is used it must also be allowed for in the timing operation of the machine.

After injection and solidification of the first charge of material it is necessary to enlarge the mold cavity to create a space into which the second charge is injected through the probe. In order to avoid the molding formed from the first charge sticking to the mold surface against which the probe engaged during injection of the first charge, and hence moving away from the opposite mold surface during enlargement of the cavity, it is desirable to allow air to bleed into, or, preferably, to blow gas such as air into, the mold cavity between the molding formed from the first charge and the mold surface against which the probe engaged after consolidation of the first charge and before or during enlargement of the mold cavity. Conveniently sintered metal plugs are provided in that mold surface through which air can be blown to break the seal between the molding and that surface. Alternatively, projections may be molded into the molding formed from the first material so that it is retained in position during enlargement of the mold cavity.

As the probe extends part of the way through the molding, care must be taken in ejecting the molding from the mold cavity. The molding must first be moved along the axis of the probe and we have found that this may conveniently be achieved by blowing gas under pressure onto the back of the molding so that it moves along the probe.

Plastics materials that may be used in the present invention are those which can be injected into a mold cavity while in the state of a viscous liquid and which can thereafter be caused to solidify in the mold cavity. Thus thermoplastic resinous materials may be used which can be injected in the form of viscous melts and allowed to solidify in the mold cavity by cooling. Alternatively thermosetting resinous materials may be used which can be injected into the mold cavity in the state of a viscous liquid and then caused to solidify by effecting cross-linking while in the cavity. Generally the thermosetting resinous materials are cross-linked by heating.

Examples of suitable injection moldable thermoplastic resins which may be used include polymers and copolymers of α-olefines, such as high and low density polyethylene, polypropylene, polybutene, poly-4-methyl pentene-1, propylene/ethylene copolymers, copolymers of 4-methyl pentene-1 with linear α-olefines containing 4 to 18 carbon atoms, and ethylene/vinyl acetate copolymers; polymers and copolymers of vinyl chloride, vinyl acetate, vinyl butyral, styrene, substituted styrenes such as α-methyl styrene, acrylonitrile, butadiene, methyl methacrylate, vinylidene chloride. Specific examples of such polymers include vinyl chloride homopolymers and copolymers of vinyl chloride with vinyl acetate, propylene, ethylene, vinylidene chloride, alkyl acrylates such as 2-ethyl hexyl acrylate, alkyl fumarates, alkyl vinyl ethers, such as cetyl vinyl ether, and N-aryl maleimides such as N-o-chlorophenyl maleimide; polyvinyl acetate, polyvinyl butyral; polystyrene, styrene/acrylonitrile copolymers; copolymers of acrylonitrile with styrene, methyl acrylate or methyl methacrylate and blends of such polymers with rubbers; polymethacrylonitrile and copolymers of methacrylonitrile with styrene, methyl acrylate or methyl methacrylate and blends of such polymers and copolymers with rubbers; copolymers of butadiene with methyl methacrylate and/or styrene and optionally acrylonitrile; polymethyl methacrylate, copolymers of methyl methacrylate with minor amounts of alkyl acrylate such as methyl acrylate, ethyl acrylate and butyl acrylate; copolymers of methyl methacrylate, N-aryl maleimides and optionally styrene; and vinylidene chloride/acrylonitrile copolymers, melt processable copolymers of tetrafluoroethylene and hexafluoropropylene.

Halogenated polymers or copolymers may be used; for example halogenated α-olefine polymers, such as chlorinated polyethylene, or halogenated vinyl chloride polymers, such as chlorinated polyvinyl chloride.

Other injection moldable thermoplastic polymers that may be used include condensation polymers such as the injection molding grades of linear polyesters such as polyethylene terephthalate; polyamides such as polycaprolactam, polyhexamethylene adipamides and copolyamides such as copolymers of hexamethylene diamine adipate and hexamethylene diamine isophthalate, particularly those containing from 5 to 15% by weight of hexamethylene diamine isophthalate; polysulphones and copolysulphones; polyphenylene oxides; polycarbonates, thermoplastic oxymethylene polymers and copolymers; thermoplastic linear polyurethanes; and the thermoplastic derivatives of cellulose such as cellulose acetate, cellulose nitrate and cellulose butyrate and mixed cellulosic esters, for example celluose acetate butyrate.

Where a copolymer is used, the amounts of the comonomers that are used in the copolymer will depend, inter alia, on the properties required of the molding.

Thermosetting resins include plastics materials that either undergo cross-linking of their own accord or in the presence of a hardener or catalyst when heated to a sufficiently high temperature. Thus the term includes a material falling within the commonly understood ambit of the term "thermosetting," and also a plastic material which is normally thermoplastic but contains a cross-linking agent such as a peroxide which causes cross-linking when the plastic is heated to a sufficiently high temperature.

Examples of suitable thermosetting resins that may be used include phenol-aldehyde resins, amine-formaldehyde resins, epoxy resins, polyester resins, thermosetting polyurethanes, and vulcanizable rubbers.

The resins may contain a hardening agent or catalyst where this is necessary to enable the resin to set.

Injection moldable cross-linkable thermoplastics include copolymers of methyl methacrylate and glycol dimethacrylate and ethylene/vinyl acetate copolymers containing a cross-linking agent.

Blends of plastics materials may be used.

The choice of materials from which the article is to be made will depend upon the use to which the article is to be put. The process of the present invention does, however, provide a particularly useful way of producing articles having a backing of relatively cheap material provided with a good facing. For example, the backing may be of a thermoplastic material containing a filler whereas the facing of a material may provide any desired surface finish.

The backing material may be the same as the facing material with the exception of additives which are included in one or in the other of the materials or in both but in different proportions. Alternatively the plastics may be quite different and also may contain different additives.

Any of the synthetic polymeric materials used in the process of the present invention may contain fillers to improve the mechanical properties of the laminates. Suitable fillers include the plate-like inorganic fillers such as mica, talc and glass plates or the fibrous inorganic fillers such as glass fibres and asbestos fibres. Alternatively synthetic fibrous materials such as polyethylene terephthalate and nylon fibres may be used. The fillers may if necessary be coated with a material which improves their adhesion to the synthetic material in which they are included.

The process of the present invention is applicable to molding laminar articles of any form and is particularly useful in the production of large area moldings in which it is desirable to have a pleasing finish which may be provided by one of the layers and a bulky backing which may be provided by the other layer. For example the process is particularly suitable for the production of panels to form part of the body of a car such as the bonnet, boot or door panels or to form the interior trim panels for motor vehicles. In some instances it is necessary to provide a molding with a rigid backing; for example for various parts of the interior trim of a vehicle a rigidly supported trim with a soft feel is required. These moldings may conveniently be made by the process of the present invention, lining one of the walls of the mold cavity with a removable insert to which the material of the first shot adheres when it is injected into the mold cavity. The insert must, of course, be provided with two holes, one to allow the first charge of material to pass therethrough and the other to allow the probe to pass through the insert. The molds used in the present invention may be so shaped that positions of attachment are molded into the finished article where clips, hinges and the like may be secured to the article.

The process of the present invention is also applicable to the manufacture of furniture in which a rigid backing or frame is covered with a layer of softer material.

The invention is illustrated by reference to the accompanying drawings wherein

Figure 2:
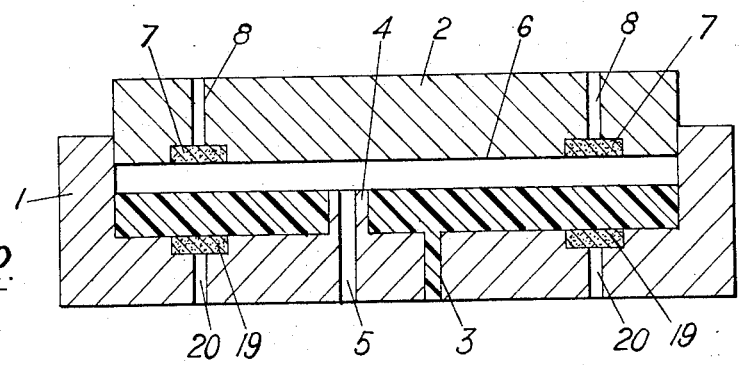
Figure 3:
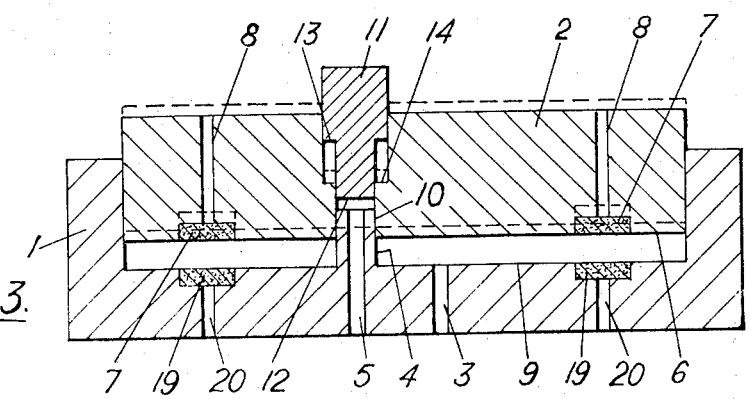
Figure 4:
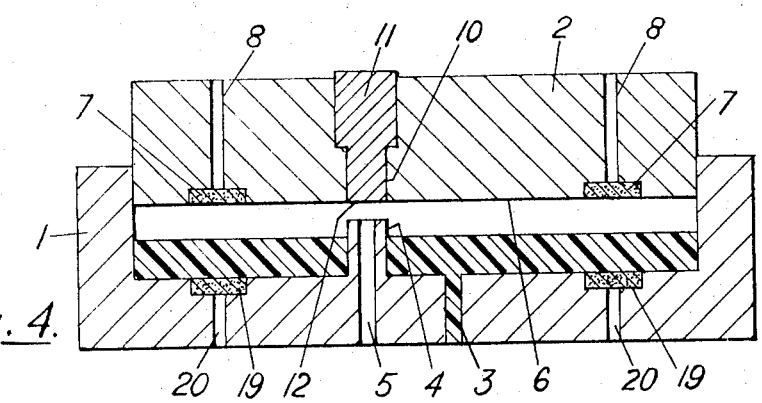
Figure 5:
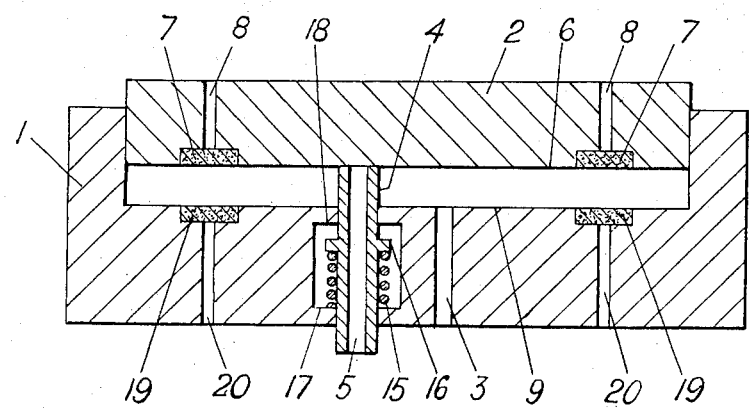

FIG. 1 is a diagrammatic cross-section through a mold in accordance with the invention, FIG. 2 is a view similar to FIG. 1 but showing the mold in the enlarged position, FIG. 3 is a view similar to FIG. 1 showing an alternative arrangement, FIG. 4 is a view similar to FIG. 3 showing the mold in the enlarged position, FIG. 5 is a view similar to FIG. 1 showing yet another arrangement.

In FIGS. 1 and 2 the mold consists of a fixed mold member 1 with which a movable mold member 2 can engage and can move to vary the size of the cavity. A sprue channel 3 is provided for injection of one charge of material from an injection unit (not shown) into the unenlarged cavity.

A fixed probe 4 having a passage 5 therethrough is also provided. When the mold cavity is at the minimum volume condition, as shown in FIG. 1, the surface 6 of mold member 2 engages with the end of the probe 4 so that material injected through sprue channel 3 can not enter the passage 5. Sintered metal plugs 7 are provided in surface 6 and the reverse side of these plugs is connected to a source of compressed air (not shown) by means of channels 8.

In operation plastics material is injected through sprue channel 3 to fill the mold cavity as shown in the position of FIG. 1. The plastics material is solidified, e.g. by cooling if a thermoplastic material is used, and then the mold cavity enlarged by retracting mold member 2 with respect to mold member 1. To prevent the molding being drawn away from surface 9 of the mold member 1 during the enlargement step, air is blown through the plugs 7 via channels 8 before or during enlargement.

The mold is enlarged to the position shown in FIG. 2 (wherein the molding formed from the first charge is shown). Since the end of probe 4 is now not engaged with the surface 6 of mold member 2, passage 5 is no longer obstructed. The second charge of material is then injected through passage 5 and then the molding solidified.

In FIG. 3, probe 4 engages in a recess 10 in mold member 2. Recess 10 is formed by retracting a mold component 11 with respect to mold member 2. When the mold cavity is enlarged to permit injection of the second charge, component 11 is biased towards mold member 1 so that the end 12 of mold component 11 lies flush with the surface 6 of mold member 1. It may be biased hydraulically or by springs (not shown). To prevent component 11 projecting into the mold cavity during filling of the enlarged cavity, shoulders 13 are provided on component 11 to limit its movement towards mold member 1 by engagement with rebates 14.

With the arrangement of FIG. 3, it is possible to inject a foamable, but unfoamed, material as the first charge through sprue channel 3 so that the cavity in its smallest condition is filled and then allow the mold cavity to enlarge (to the position shown in FIG. 3 by the dotted line), while maintaining probe 4 in engagement with recess 10, to permit the foamable material to foam. After solidification of the foamed material, the cavity is enlarged further, to the position shown in FIG. 4, to permit injection of the material although passage 5.

In the embodiment shown in FIG. 5, the probe 4 is movable so that it can project differing distances across the mold cavity, i.e. it is telescopic. It is biased towards mold member 2 by a spring 15 bearing between a flange 16 on the probe and a rebate 17 in mold member 1. Its movement towards mold member 2, when the cavity is enlarged to permit injection of the material through passage 5, is limited by abutment of the other face of flange 16 with rebate 18 in mold member 1.

It will be appreciated that, like the embodiment of FIGS. 3 and 4, this arrangement can be used to allow partial enlargement of the mold cavity, to permit foaming of material injected through sprue channel 3, before the enlargement of the cavity to permit injection of material through passage 5.

In each of the embodiments depicted in the drawings, sintered metal plugs 19 are also provided in mold surface 9 through which compressed air can be blown, via channels 20, to assist ejection of the molding over probe 4 after solidification of the material injected through passage 5.

We claim:

1. A process for the production of laminar articles from synthetic polymeric materials in which a first charge of polymeric material is injected into a mold cavity through a first injection orifice and, when said first charge has consolidated, the mold cavity is enlarged and a second charge of polymeric material is injected into the mold cavity through a second injection orifice at the end of a probe which extends through the layer formed by the injection of said first charge.

2. A process according to claim 1 in which the probe projects across the complete thickness of the mold cavity so that when the mold cavity is at its smallest volume the injection orifice at the end of the probe engages with one of the faces of the mold cavity so that the orifice at the end of the probe is not in communication with the mold cavity and enlargement of the mold cavity, after the first charge has consolidated, is brought about by causing relative movement to take place between that face and an opposed face of the mold cavity so that the orifice at the end of the probe is opened into communication with the mold cavity to allow the second charge of material to be injected into the enlarged cavity through the orifice at the end of the probe.

3. A process according to claim 1 in which at least part of one of the charges of material is a foamable material.

4. A process according to claim 3, in which said one charge is made up of two separate charges of material, a first charge of unfoamable material and a second charge of foamable material which are injected through the same injection orifice.

5. A process according to claim 3 in which the charge of foamable material is of a size that will fill the mold cavity when the required amount of foaming has taken place.

6. A process according to claim 3 in which the mold cavity is enlarged when the foamable charge has been injected to allow the charge to foam.

7. A process according to claim 3 in which the foamable charge is the second charge of polymeric material.

8. A process according to claim 6 in which the foamable charge is the first charge of polymeric material, and a telescopic probe is used which is biased to bear against the opposite face of the mold cavity while it is enlarging to allow the first charge to foam, the biasing mechanism being such that the injection orifice at the end of the probe is opened into communication with the mold cavity when the mold cavity is enlarged for the second time to allow the second charge of material to be introduced.

9. A process according to claim 6 in which the foamable charge is the first charge of polymeric material, and the probe is constructed so that it passes through the mold cavity when it is at its minimum volume to slidably engage with a recess formed in the opposite face of the mold cavity in such a way that the injection orifice at the end of the probe is maintained not in communication with the mold cavity while the mold is enlarged to allow the first charge to foam but is opened into communication with the mold cavity when the mold cavity is further enlarged after the first charge has consolidated.

10. A process according to claim 1 in which the volume of the mold cavity is decreased after the first charge has been injected therein while the orifice at the end of the probe is kept in engagement with the opposed face of the mold cavity as compression is effected.

11. A process according to claim 10 in which the probe is maintained in engagement by using a telescopic probe which is biased against the opposite face of the mold cavity.

12. A process according to claim 1 in which the molding when ejected from the mold cavity is first moved along the axis of the probe by blowing gas under pressure onto the back of the molding.

13. A process according to claim 1 in which one of the walls of the mold cavity is lined with a removable insert to which the material of the first charge adheres when it is injected into the mold cavity, the insert being provided with two holes, one to allow the first charge of material to pass therethrough and the other to allow the probe to pass through the insert.

14. A process according to claim 1 in which gas under pressure is blown into the mold cavity between the mold face with which the probe engages and the first charge molded against said face after consolidation of the first charge and before or during enlargement of the mold cavity, whereby the molded first charge is separated from said face.

References Cited
UNITED STATES PATENTS

| | | | |
|---|---|---|---|
| 3,480,704 | 11/1969 | Ludwig | 264—46 |
| 3,531,553 | 9/1970 | Bodkins | 264—45 |
| 3,608,004 | 9/1971 | Borisuck | 264—244 |
| 3,705,222 | 12/1972 | Rodgers et al. | 264—45 |
| 3,286,004 | 11/1966 | Hill et al. | 264—45 |
| 3,248,758 | 5/1966 | Schmitz et al. | 264—45 |
| 3,589,967 | 6/1971 | Shirakawa | 264—45 |

HOSEA E. TAYLOR, Primary Examiner

G. R. MARSHALL, Assistant Examiner

U.S. Cl. X.R.

264—46, 328; 425—120